United States Patent
Arai et al.

(10) Patent No.: US 10,017,654 B2
(45) Date of Patent: *Jul. 10, 2018

(54) AQUEOUS INKJET INK FOR HUMIDITY-CONDITIONING BASE MATERIAL AND METHOD FOR PRODUCING DECORATED HUMIDITY-CONDITIONING BASE MATERIAL

(71) Applicant: RISO KAGAKU CORPORATION, Tokyo (JP)

(72) Inventors: Sayako Arai, Ibaraki (JP); Hirotaka Yamamoto, Ibaraki (JP); Ami Terakado, Ibaraki (JP); Shinji Tabuchi, Ibaraki (JP); Yoshihisa Morita, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 15/093,515

(22) Filed: Apr. 7, 2016

(65) Prior Publication Data

US 2016/0319145 A1 Nov. 3, 2016

(30) Foreign Application Priority Data

Apr. 30, 2015 (JP) ................. 2015-092987

(51) Int. Cl.
| | |
|---|---|
| B41J 2/01 | (2006.01) |
| C09D 11/30 | (2014.01) |
| C09D 11/38 | (2014.01) |
| C09D 133/08 | (2006.01) |
| C09D 175/04 | (2006.01) |
| C09D 11/10 | (2014.01) |
| C09D 11/54 | (2014.01) |
| C04B 41/00 | (2006.01) |
| C04B 41/48 | (2006.01) |
| C04B 41/63 | (2006.01) |
| B41M 5/00 | (2006.01) |

(52) U.S. Cl.
CPC ............. *C09D 11/38* (2013.01); *B41J 2/01* (2013.01); *C04B 41/009* (2013.01); *C04B 41/483* (2013.01); *C04B 41/4884* (2013.01); *C04B 41/63* (2013.01); *C09D 11/10* (2013.01); *C09D 11/30* (2013.01); *C09D 11/54* (2013.01); *C09D 133/08* (2013.01); *C09D 175/04* (2013.01); *B41M 5/0017* (2013.01)

(58) Field of Classification Search
CPC . C04B 41/009; C04B 41/483; C04B 41/4884; C04B 41/63; C09D 11/10; C09D 11/30; C09D 11/38; C09D 11/54; C09D 133/08; C09D 175/04; B41J 2/01
See application file for complete search history.

(56) References Cited

U.S. PATENT DOCUMENTS

| | | | |
|---|---|---|---|
| 5,984,466 A | 11/1999 | Nagashima | |
| 2003/0010258 A1 | 1/2003 | Fukuda | |
| 2003/0179269 A1 | 9/2003 | Yamanouchi et al. | |
| 2007/0052785 A1 | 3/2007 | Itoh et al. | |
| 2008/0282932 A1* | 11/2008 | Kiyomoto | C09D 11/322 106/31.65 |
| 2009/0182098 A1 | 7/2009 | Sano et al. | |
| 2010/0196601 A1 | 8/2010 | Goto et al. | |
| 2010/0277541 A1 | 11/2010 | Watanabe et al. | |
| 2011/0164086 A1 | 7/2011 | Goto et al. | |
| 2012/0232203 A1 | 9/2012 | Tomura et al. | |
| 2013/0053485 A1 | 2/2013 | Misawa et al. | |
| 2014/0139595 A1 | 5/2014 | Hong et al. | |
| 2015/0017402 A1 | 1/2015 | Suzuki et al. | |
| 2015/0105504 A1 | 4/2015 | Verheggen et al. | |
| 2016/0229177 A1* | 8/2016 | Yamamoto | B41J 2/01 |

FOREIGN PATENT DOCUMENTS

| | | |
|---|---|---|
| CN | 1736935 A | 2/2006 |
| EP | 1759858 A1 | 3/2007 |
| JP | 6-344654 A | 12/1994 |
| JP | 2002-004447 | 1/2002 |
| JP | 2002-154864 | 5/2002 |
| JP | 2003-146775 | 5/2003 |
| JP | 2006-192587 A | 7/2006 |
| JP | 2007-044614 A | 2/2007 |
| JP | 2011-026871 | 2/2011 |
| WO | 02/100652 | 12/2002 |
| WO | 2012170036 | 12/2012 |
| WO | 2013/129523 | 9/2013 |
| WO | WO-2013/131924 A1 * | 9/2013 |
| WO | WO-2013/189746 A1 * | 12/2013 |
| WO | 2014135843 | 9/2014 |
| WO | 2014147373 | 9/2014 |
| WO | 2015/080246 A1 | 6/2015 |
| WO | 2015115600 | 8/2015 |

OTHER PUBLICATIONS

Extended European Search Report, dated May 27, 2016; European Patent Application No. 16163504.0 ( 9 pages).
International Search Report for PCT/JP2014/081543, dated Mar. 3, 2015, and English translation thereof, 4 pages total.
Japanese Office Action dated Nov. 4, 2014 in JP application No. 2014-198206, 2 pages total.
Japanese Office Action dated Jan. 6, 2015 in JP application No. 2014-198206, 3 pages total.
(Continued)

*Primary Examiner* — Irina S Zemel
*Assistant Examiner* — Jeffrey S Lenihan
(74) *Attorney, Agent, or Firm* — Hamre, Schumann, Mueller & Larson, P.C.

(57) ABSTRACT

Disclosed is an aqueous inkjet ink for a humidity-conditioning base material, the ink comprising water, a water-dispersible resin, a colorant, and at least one surfactant selected from among acetylene glycol-based surfactants and silicone-based surfactants.

14 Claims, No Drawings

(56) References Cited

OTHER PUBLICATIONS

English Translation of the International Preliminary Report on Patentability for PCT/JP2014/081543, dated Jun. 9, 2016 (9 pages).
Chinese Office Action, Chinese Patent Application No. 201480056405.5, dated Dec. 12, 2016.
Extended European Search Report, European Patent Application No. 14865517.8, dated May 30, 2017 (9 pages).
Extended European Search Report, dated Jul. 5, 2016, European Patent Application 16163505.7 (8 pages).

* cited by examiner

AQUEOUS INKJET INK FOR HUMIDITY-CONDITIONING BASE MATERIAL AND METHOD FOR PRODUCING DECORATED HUMIDITY-CONDITIONING BASE MATERIAL

CROSS REFERENCE TO RELATED APPLICATIONS

This Application is based upon and claims the benefit of priority from prior Japanese Application 2015-092987 filed on Apr. 30, 2015; the entire contents of which are incorporated by reference herein.

BACKGROUND OF THE INVENTION

Technical Field

Embodiments of the present invention relate to an aqueous inkjet ink for decorating a surface of "a humidity-conditioning base material" or "a humidity-conditioning material" that can be used as the material for a humidity-conditioning construction material or the like, and a method for producing a decorated humidity-conditioning base material using the ink.

Background Art

Humidity-conditioning construction materials are fabricated from porous materials, and therefore have a multitude of pores in their surfaces, and because these pores exhibit moisture adsorption and desorption properties, these construction materials have the ability to control the humidity within a target space such as an indoor room.

Under the humidity-conditioning construction material certification system, humidity-conditioning construction materials which satisfy certain humidity-conditioning properties and other conditions prescribed in humidity-conditioning construction material standards can be registered with the Japan Construction Material & Housing Equipment Industries Federation, and a special humidity-conditioning construction material mark can be displayed on registered humidity-conditioning construction materials as a guarantee of quality. Within these humidity-conditioning construction material standards, the registration conditions relating to the humidity-conditioning properties require that the material clears prescribed levels for the amount of moisture adsorption and desorption (JIS A 1470-1:2002, Determination of water vapor adsorption/desorption properties for building materials—Part 1: Response to humidity variation—method for testing water vapor adsorption/desorption upon humidity variation) and the equilibrium moisture content (namely, the moisture content gradient and the average equilibrium moisture content) (JIS A 1475:2004, Method of test for hygroscopic sorption properties of building materials).

Further, in humidity-conditioning performance evaluation standards for humidity-conditioning construction materials compiled in March 2006 by the Humidity-Conditioning Construction Materials Performance Evaluation Committee, humidity-conditioning construction materials are classified into three grades shown below in Table 1 on the basis of the aforementioned amount of moisture adsorption and desorption and the equilibrium moisture content. Grade 1 describes a material that satisfies the minimum level of performance required for a humidity-conditioning construction material, grade 3 describes a material having excellent performance as a humidity-conditioning construction material, and grade 2 describes a material having performance midway between grade 1 and grade 3. These humidity-conditioning performance evaluation standards for humidity-conditioning construction materials are listed on the website of the Japan Testing Center for Construction Materials (http://www.jtc-cm.or.jp/main_services/seino/seino_jigyou_cyositu.html).

In the case of the moisture adsorption and desorption properties, the standards stipulate that the amount of moisture adsorption at a relative humidity of 50 to 75% should exceed the numerical value shown below in Table 1, and the amount of moisture desorption after 12 hours should be about 70% or more of the amount of moisture adsorption over 12 hours, whereas in the case of the equilibrium moisture content, the standards stipulate that the value for the equilibrium moisture content in the moisture adsorption process (the moisture content mass by volume) should exceed the numerical value shown below in Table 1.

TABLE 1

| JIS A 1470-1 (Amount of moisture adsorption g/m$^2$) | | | |
|---|---|---|---|
| Amount of moisture adsorption | 3 hours | 6 hours | 12 hours |
| Grade 3 | 36 | 50 | 71 |
| Grade 2 | 25 | 35 | 50 |
| Grade 1 | 15 | 20 | 29 |

| JIS A 1475 (Moisture content gradient $\Delta\psi$ (kg/m$^3$/%), average equilibrium moisture content $\psi$ (kg/m$^3$)) | | |
|---|---|---|
| Equilibrium moisture content | Moisture content gradient | Average equilibrium moisture content |
| Grade 3 | 0.4 | 18 |
| Grade 2 | 0.26 | 11 |
| Grade 1 | 0.12 | 5 |

(Note)
Average equilibrium moisture content describes the value at a relative humidity of 55%

Known humidity-conditioning construction materials include materials fabricated from all manner of porous materials, and examples of humidity-conditioning construction materials containing an unexpanded vermiculite blended with calcium silicate include MOISS (a product name) manufactured by Mitsubishi Materials Kenzai Corporation, SARARIART (a product name) manufactured by Daiken Corporation, ECOCARAT (a product name) manufactured by LIXIL Corporation (Inax), AG PLUS (a product name) manufactured by Nagoya Mosaic-Tile Co., Ltd., GAUDIA (a product name) manufactured by Sekisui Board Co., Ltd., and MONSIEUR (a product name) manufactured by Nikko Company.

In those cases where a humidity-conditioning construction material is used as an interior material, it is desirable that the surface of the humidity-conditioning construction material is decorated to enhance the decorative design characteristics, and a number of methods for decorating humidity-conditioning construction materials have already been proposed.

JP 2003-146775 A (Patent Document 1) discloses a technique for obtaining a construction material with excellent design characteristics by subjecting the surface of a humidity-conditioning construction material obtained by blending an unexpanded vermiculite with calcium silicate to a baking treatment.

JP 2011-26871 A (Patent Document 2) discloses a technique for decorating the surface of a humidity-conditioning construction material by using an inkjet recording device and an ultraviolet-curable ink to form an image on the surface of the material.

SUMMARY OF THE INVENTION

An object of the present invention is to provide an ink than can form a high-quality image with excellent water abrasion resistance on the surface of a humidity-conditioning base material that can be used in a humidity-conditioning construction material or the like, without impairing the humidity-conditioning performance of the humidity-conditioning base material.

One embodiment of the present invention provides an aqueous inkjet ink for a humidity-conditioning base material, the ink comprising water, a water-dispersible resin, a colorant, and at least one surfactant selected from among acetylene glycol-based surfactants and silicone-based surfactants.

Another embodiment of the present invention provides a method for producing a decorated humidity-conditioning base material comprising a step of performing inkjet printing onto a surface of a humidity-conditioning base material using the aqueous inkjet ink for a humidity-conditioning base material according to the embodiment above.

Yet another embodiment of the present invention provides a decorated humidity-conditioning base material comprising a decorative portion formed using the aqueous inkjet ink for a humidity-conditioning base material according to the embodiment above, having an amount of moisture adsorption, measured after 3 hours in accordance with JIS A 1470-1 (2002), of greater than 15 g/m$^2$.

EMBODIMENTS FOR CARRYING OUT THE INVENTION

Embodiments of the present invention are described below in detail, but the present invention is in no way limited by these embodiments, and various modifications and alterations are possible. In the present description, the terms "weight" and "mass" are deemed to have the same meaning, and the term "weight" is used below for the sake of consistency.

In the following description, the aqueous inkjet ink is sometimes described as simply "the ink" or "the aqueous ink", and the humidity-conditioning base material may be referred to as "the porous material" or "the porous base material".

The technique of Patent Document 1 requires the surface of the humidity-conditioning construction material to be heated at a high temperature during the baking treatment, and as a result, some components contained within the construction material may undergo carbonization and turn black, meaning the product suffers from poor color representation and image representation, and achieving a full-color image is difficult.

In the technique of Patent Document 2, those portions to which the ultraviolet-curable ink has been adhered suffer from reduced humidity-conditioning performance, and therefore the surface area of the image must be restricted to not more than ⅓ of the total surface area of the porous base material. A plurality of the humidity-conditioning construction material panels are usually installed side by side, but if there is a limit on the surface area of the image, then generating a pattern that spans a plurality of the humidity-conditioning construction material panels is extremely difficult. Moreover, there is a possibility that uncured ultraviolet-curable ink may remain within the interior of the humidity-conditioning construction material, and therefore safety issues arise in relation to use of the material as an interior material, and potential adverse effects on people are also a concern. Further, materials with humidity-conditioning performance that can be used as humidity-conditioning construction materials may be used not only as construction materials, but also as coasters or foot mats or the like, and it is desirable that the decorative portion of these materials has water abrasion resistance of a level that presents no practical problems when used in a variety of products.

In this manner, conventionally, formation of a high-quality image with excellent water abrasion resistance on the surface of a humidity-conditioning construction material without impairing the humidity-conditioning performance has proven difficult.

In contrast, with the ink for a humidity-conditioning base material according to an embodiment of the present invention, when the ink is discharged onto the base material, the water that acts as the solvent penetrates rapidly into the interior of the base material, and the water-dispersible resin and the colorant are fixed favorably to the surface of the humidity-conditioning base material, meaning the water abrasion resistance can be improved. Further, because the specified surfactant enhances the storage stability of the ink, any deterioration in the quality of the ink can be inhibited for long periods, not only during sealed storage, but also in a state where the ink is installed within a printer. As a result, even if the ink is left in an unused state for a period of time, the ink can still be subsequently discharged in a stable manner from the print head, and the image quality of the formed decorative portion can be improved. Moreover, because the solvent component of the ink is water, the ink is very safe, and volatilization of the water suppresses blockages of the pores within the humidity-conditioning base material. Consequently, this embodiment of the present invention can form a high-quality decorative image with excellent water abrasion resistance across a broad area of the surface of a humidity-conditioning base material without impairing the humidity-conditioning performance of the humidity-conditioning base material.

<Humidity-Conditioning Base Material>

The humidity-conditioning base material is a porous base material having a humidity-conditioning function, and comprises a multitude of pores in the surfaces and in the interior of the material. There are no particular limitations on the humidity-conditioning base material, provided these pores exhibit moisture adsorption and desorption properties. The shape of the porous base material is typically a board shape, namely a sheet-like shape, but is not limited to such shapes.

The diameters of the pores in the porous base material are typically from about 1 to 200 nm or about 1 to 100 nm, and more specifically, typically include mesopores having a diameter of 1 to 50 nm and macropores having a diameter exceeding 50 nm (for example, a diameter exceeding 50 nm but not more than 200 nm, or a diameter exceeding 50 nm but not more than 100 nm). The diameter of the mesopores can be measured, for example, by the mercury penetration method using a mercury porosimeter.

Representative examples of the porous base material include hardened bodies of inorganic materials such as calcium silicate, and examples include materials containing inorganic powders having moisture adsorption and desorption capabilities such as silicate powders, silica gel, diatomaceous earth, activated clay, zeolite, bentonite, montmorillonite and sepiolite, as well as materials obtained by additional firing of these hardened bodies. Specific examples of the porous base material include the types of materials used for humidity-conditioning construction materials and the like, and humidity-conditioning construction materials that have been registered with the Japan Construction Material & Housing Equipment Industries Federation are preferred. In other words, humidity-conditioning construction materials of grade 1 or higher, having performance levels that satisfy the humidity-conditioning performance evaluation standards listed above in Table 1, can be used particularly favorably. As mentioned above, examples of such materials include porous base materials that exhibit an amount of moisture adsorption, measured after 3 hours in accordance with JIS A 1470-1 (2002), that is greater than 15 g/m$^2$.

More specific examples include humidity-conditioning construction materials disclosed in JP 2003-146775 A, obtained by molding one or more hydrophilic materials selected from among gypsum, calcium silicate, cement, gypsum slag and basic magnesium carbonate, humidity-conditioning construction materials obtained by molding a material prepared by adding expanding and/or releasing minerals to one or more of the above hydrophilic materials, and humidity-conditioning construction materials such as those disclosed in JP 2002-4447 A, produced by a carbon dioxide hardening reaction of a molded body containing calcium carbonate and amorphous silica as the main components. Humidity-conditioning construction materials obtained by molding a material containing unexpanded vermiculite blended with calcium silicate, such as the materials disclosed in JP 2003-146775 A, can be used particularly favorably as the porous base material.

<Aqueous Inkjet Ink for Humidity-Conditioning Base Material>

The aqueous ink according to an embodiment of the present invention is used for decorating the surface of an aforementioned humidity-conditioning base material. In other words, the ink is prepared so as to be particularly suitable for application to humidity-conditioning base materials (such as humidity-conditioning construction materials), and comprises at least water, a water-dispersible resin, a colorant, and a surfactant. In the present description, the term "decorate" means to ornament, and has the meaning of forming a printed image. Accordingly, the terms "decorated" or "decorative" describe a material having a printed image. This decorative portion may cover the entire surface or a portion of the surface of the target material, namely the humidity-conditioning base material.

The ink of the present embodiment can form a vibrant image with a small amount of colorant on the surface of a humidity-conditioning base material, without impairing the humidity-conditioning performance of the material, for example with retention of the same grade as that prior to decoration in the case of a humidity-conditioning construction material. Even when the printed region of the image covers the entire surface of the porous base material, the humidity-conditioning construction material grade can be maintained at the same grade as that prior to decoration. Further, because there are no restrictions on the recording surface area of the image, all manner of designs and text and the like can be produced with total freedom.

There are no particular limitations on the water, provided it can function as a solvent, namely a vehicle, for the ink, and tap water, ion-exchanged water, or deionized water or the like can be used. Water is a highly volatile solvent, and readily evaporates following discharge onto the porous base material, and therefore blocking of the pores of the porous base material following decoration can be prevented, and any deterioration in the humidity-conditioning performance of the decorated porous base material can also be prevented. Further, water is also non-toxic and extremely safe, and does not have the problems associated with VOCs and the like, meaning the decorated porous base material (decorative article) is very environmentally friendly.

The larger the water content in the ink, the greater the effect in preventing deterioration in the humidity-conditioning performance of the porous base material, and therefore the water content is preferably at least 60% by weight, and more preferably 65% by weight or more, of the total weight of the ink. Further, the water content is preferably not more than 95% by weight, and more preferably 90% by weight or less.

If necessary, the ink solvent may also include water-miscible organic solvents in addition to the water. Organic compounds which are liquid at room temperature and can be dissolved in water can be used as the water-miscible organic solvents, and the use of a water-miscible organic solvent which mixes uniformly with an equal volume of water at one atmosphere and 20° C. is preferable.

Examples of organic solvents that may be used include lower alcohols such as methanol, ethanol, 1-propanol, isopropanol, 1-butanol, 2-butanol, isobutanol and 2-methyl-2-propanol; glycols such as ethylene glycol, diethylene glycol, triethylene glycol, tetraethylene glycol, polyethylene glycol, propylene glycol, dipropylene glycol, tripropylene glycol and polypropylene glycol; glycerols such as glycerol, diglycerol, triglycerol and polyglycerol; acetins such as monoacetin, diacetin and triacetin; glycol ethers such as ethylene glycol monomethyl ether, ethylene glycol monoethyl ether, ethylene glycol monopropyl ether, ethylene glycol monobutyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether, triethylene glycol monobutyl ether, tetraethylene glycol monomethyl ether, tetraethylene glycol monoethyl ether, tetraethylene glycol dimethyl ether, and tetraethylene glycol diethyl ether; as well as triethanolamine, 1-methyl-2-pyrrolidone, 1,3-dimethyl-2-imidazolidinone, β-thiodiglycol and sulfolane. These organic solvents may be used individually, or a mixture containing two or more solvents may be used, provided the solvents form a single phase.

From the viewpoints of viscosity regulation and moisture retention, the amount of water-miscible organic solvents is preferably not more than 50% by weight of the ink (or not more than 60% by weight of the solvent).

Both pigments and dyes can be used as the colorant, and the pigments and dyes may be used separately, or the two may be combined. From the viewpoints of the weather resistance and print density of the decorative image, a pigment is preferably used as the colorant.

The amount of the colorant is preferably within a range from 0.01 to 20% by weight relative to the total weight of the ink. Further, the amount of the colorant is more preferably at least 0.1% by weight, still more preferably at least 0.5% by weight, and most preferably 1% by weight or greater. Moreover, the amount of the colorant is more preferably not more than 15% by weight, still more preferably not more than 10% by weight, and most preferably 8% by weight or less.

Any of the dyes typically used in the technical field of printing may be used without any particular limitations. Specific examples include basic dyes, acid dyes, direct dyes, soluble vat dyes, acid mordant dyes, mordant dyes, reactive dyes, vat dyes and sulfide dyes, and among these, water-soluble dyes and dyes that become soluble upon reduction or the like can be used. More specific examples of dyes that may be used include azo dyes, rhodamine dyes, methine dyes, azomethine dyes, xanthene dyes, quinone dyes, triphenylmethane dyes, diphenylmethane dyes, and methylene blue. These dyes may be used individually, or a combination of two or more dyes may be used.

Examples of pigments that may be used include organic pigments such as azo pigments, phthalocyanine pigments, polycyclic pigments and dye lake pigments, as well as inorganic pigments. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Representative examples of the inorganic pigments include carbon black and titanium oxide. These pigments may be used individually, or a combination of two or more pigments may be used.

The water-dispersible resin is added to ensure satisfactory fixation of the colorant to the porous base material, enabling superior coloration to be obtained with a small amount of colorant.

A resin that forms a transparent coating is preferably used as the water-dispersible resin. Further, resins that can form particles within the aqueous ink, namely resins that can form oil-in-water (O/W) resin emulsions, are preferable, and these resins can be added as resin emulsions.

Representative examples include ethylene-vinyl chloride copolymer resins, (meth)acrylic resins, styrene-maleic anhydride copolymer resins, urethane resins, vinyl acetate-(meth)acrylic copolymer resins, vinyl acetate-ethylene copolymer resins, and resin emulsions of these resins. Here, the expression "(meth)acrylic resins" includes both acrylic resins and methacrylic resins.

Among these aqueous resins and emulsions, from the viewpoints of achieving stable discharge performance from the inkjet head, and achieving good adhesion to the inorganic porous materials such as diatomaceous earth, vermiculite, kaolinite, gypsum, tile chamotte, slaked lime and ceramic porous powders which are used as the raw material for the porous base material such as the humidity-conditioning construction material, a urethane resin (emulsion) having a glass transition temperature (Tg) of −35 to 40° C. is preferable. Specific examples of such aqueous resin emulsions include the products SUPERFLEX 460, 420, 470 and 460S (carbonate-based urethane resin emulsions), 150HS (an ester-ether-based urethane resin emulsion), and 740 and 840 (aromatic isocyanate-based ester-based urethane resin emulsions) manufactured by DKS Co., Ltd., and the products NeoRez R-9660 and R-2170 (aliphatic polyester-based urethane resin emulsions), NeoRez R-966, R-967 and R-650 (aliphatic polyether-based urethane resin emulsions) and R-986 and R-9603 (aliphatic polycarbonates) manufactured by DSM N.V.

Furthermore, from the viewpoints of achieving good compatibility with the various other materials in the ink to ensure good ink stability, and being inexpensive, thereby enabling inks to be designed at low cost, the use of a (meth)acrylic resin or a (meth)acrylic resin copolymer is preferable. Specific examples include the products MOWINYL 966A, 6963 and 6960 (acrylic resin emulsions) and 6969D and RA-033A4 (styrene/acrylic resin emulsions) manufactured by The Nippon Synthetic Chemical Industry Co., Ltd., the products JONCRYL 7100, PDX-7370 and PDX-7341 (styrene/acrylic resin emulsions) manufactured by BASF Corporation, and the products VONCOAT EC-905EF, 5400EF and CG-8400 (acrylic/styrene-based emulsions) manufactured by DIC Corporation.

The water-dispersible resin may be composed of a single type of resin (or emulsion) such as a single urethane resin or acrylic resin, or may be a combination of a plurality of resins (or resin emulsions).

The water-dispersible resin exists in particulate form in the ink. The particle size of these water-dispersible resin particles should be a size suitable for inkjet printing, and generally, an average particle size of not more than 300 nm is preferred. Provided the particle size is of this type of size suitable for inkjet printing, the pores of the porous base material are not blocked completely, and the humidity-conditioning performance is able to be favorably maintained. In order to better maintain this humidity-conditioning performance, the average particle size is more preferably not more than 250 nm, still more preferably not more than 200 nm, still more preferably not more than 150 nm, and most preferably 90 nm or less. In addition, if a pigment is used as the colorant, then from the viewpoint of enhancing the binding between pigment particles, the particle size of the water-dispersible resin is preferably smaller than the average particle size of the pigment (generally about 80 to 200 nm).

In this description, unless specifically stated otherwise, the average particle size refers to a volume-based particle size (median value) in a particle size distribution measured using a dynamic light scattering method. Apparatus such as the nanoparticle analyzer nano Partica SZ-100 (manufactured by Horiba, Ltd.) can be used as the dynamic light scattering particle size distribution measuring apparatus. In the ink, or in the surface treatment liquid described below, a configuration in which the water-dispersible resin particles or the inorganic particles exist as independent fine particles and a configuration in which the fine particles exist in the form of clustered aggregates of the independent particles are possible, but the median size measured by the dynamic light scattering method is deemed to represent the "average particle size".

Although there are no particular limitations on the lower limit for the average particle size, from the viewpoint of the ink storage stability, the average particle size is preferably at least about 5 nm, and is more preferably 10 nm or greater.

Measurement of the average particle size of the above resin particles in the raw material emulsion state prior to preparation of the ink is preferable in terms of removing the effects of the colorant (pigment particles), and the thus obtained measured value can be used as the average particle size in the present embodiment.

The amount (solid fraction amount) of the water-dispersible resin within the ink, reported as a ratio between the colorant and the water-dispersible resin (colorant:water-dispersible resin,) is preferably within a range from 1:0.5 to 1:7 (weight ratio), and is more preferably from 1:0.75 to 1:5.0. By ensuring that the amount of the water-dispersible resin satisfies this range, good water abrasion resistance and high image quality can be achieved for the image printed on the surface of the porous base material. If the amount of the water-dispersible resin is less than 0.5 relative to a value of 1 for the colorant, then there is a possibility that the fixability of the pigment may deteriorate, whereas if the amount is greater than 7, then the viscosity increases, and there is a possibility that the ink may not be able to be discharged satisfactorily from the ink discharge head.

The surfactant is added for the purpose of suppressing aggregation of the water-dispersible resin (particles). Particularly in those cases where the particle size of the water-dispersible resin particles is small, the effects of changes in the temperature of the storage environment, or contamination of the ink with impurities or the like can lead to the formation of foreign matter due to aggregation between resin particles or aggregation of resin particles that also incorporates the colorant, and this can cause a deterioration in the quality of the printed image due to a decrease in the viscosity of the ink, or the foreign matter may adhere or accumulate inside the inkjet head and cause discharge faults.

In the present embodiment, by adding a specific surfactant, namely at least one surfactant selected from among acetylene glycol-based surfactants and silicone-based surfactants, this type of aggregation of the resin particles can be effectively suppressed, even when the particle size of the resin particles is small.

Further, acetylene glycol-based surfactants and silicone-based surfactants impart the ink with good wettability relative to the porous base material, enabling formation of a high-quality image on the porous base material.

The acetylene glycol-based surfactants are nonionic surfactants having an acetylene glycol group. Examples of commercially available products include the acetylene glycols SURFYNOL 104E and 104H, and SURFYNOL 420, 440, 465 and 485 and the like which have structures in which ethylene oxide has been added to acetylene glycol (manufactured by Air Products and Chemicals, Inc.), the acetylene glycols OLFINE E-1004, E-1010, E-1020, PD-002W, PD-004, EXP-4001, EXP-4200, EXP-4123 and EXP-4300 and the like (manufactured by Nissin Chemical Industry Co., Ltd.), and the acetylene glycols ACETYLENOL E00 and E00P, and ACETYLENOL E40 and E100 and the like which have structures in which ethylene oxide has been added to acetylene glycol (manufactured by Kawaken Fine Chemicals Co., Ltd.).

In the present embodiment, the use of a silicone-based surfactant is particularly preferable, as such surfactants yield particularly good suppression of any decrease in the ink viscosity, and have a strong effect in terms of enabling formation of a high-quality image on the porous base material. It is thought that because silicone-based surfactants have an extremely high surface tension reduction ability and contact angle reduction ability, the speed of penetration of the ink solvent into the interior of the porous base material when the ink is applied to the surface of the porous base material can be increased. As a result, it is thought that the colorant and the resin particles in the ink separate rapidly from the ink solvent and are more likely to accumulate on the base material surface, thus yielding an image having high print density and minimal bleeding.

Specific examples of the silicone-based surfactants include BYK-302, BYK-307, BYK-325, BYK-331, BYK-333, BYK-342, BYK-345/346, BYK-347, BYK-348, BYK-349 and BYK-378 (all manufactured by BYK-Chemie Japan K.K.), L-7001, L-7002, L-7604, FZ-2105 and 8032 ADDITIVE (all manufactured by Dow Corning Toray Co., Ltd.), KF-6011, KF-6011P, KF-6013, KF-6004 and KF-6043 (all manufactured by Shin-Etsu Chemical Co., Ltd.), DISPARLON AQ-7120, DISPARLON AQ-7130 and DISPARLON 7180 (all manufactured by Kusumoto Chemicals, Ltd.), and SILFACE SAG503A, SILFACE SAG001, SILFACE SAG002, SILFACE SAG003, SILFACE SAG005 and SILFACE SAG008 (all manufactured by Nissin Chemical Co., Ltd.).

Among the various silicone-based surfactants, polyether-modified siloxane compounds are particularly preferred in terms of the ink storage stability and the wettability of the porous base material. Among silicone-based surfactants, polyether-modified silicone-based surfactants, alkyl/aralkyl-comodified silicone-based surfactants and acrylic silicone-based surfactants are preferred. Commercially available products that can be used particularly favorably include the aforementioned "SILFACE SAG" series.

An acetylene glycol-based surfactant or a silicone-based surfactant may be used alone as the surfactant, the two types of surfactants may be combined, or a combination with one or more other surfactants having good compatibility may be used. Examples of these other surfactants include anionic surfactants (such as alkyl sulfate ester salts, polyoxyethylene alkyl ether sulfate ester salts, and alkyl benzene sulfonate salts), nonionic surfactants (such as polyoxyethylene alkyl ethers, sorbitan fatty acid esters, polyoxyethylene sorbitan fatty acid esters, polyoxyethylene sorbitol fatty acid esters, glycerol fatty acid esters, and polyoxyethylene fatty acid esters) and fluorine-based surfactants, although this is not an exhaustive list.

The amount of the surfactant in the ink is preferably at least about 0.1% by weight, more preferably at least 0.3% by weight, and still more preferably 0.5% by weight or greater, but the amount of the surfactant is preferably not more than about 5% by weight, more preferably not more than 4% by weight, and still more preferably 3% by weight or less.

Components other than those described above may also be added to the ink, provided they have no adverse effects on the properties of the ink, and examples of these other components include humectants, antifoaming agents, pH modifiers, antioxidants and preservatives.

There are no particular limitations on the method used for producing the ink, and appropriate conventional methods may be used. For example, the ink can be prepared by dispersing all of the components in a conventional dispersion device such as a beads mill, either in a single batch or in a number of separate batches, and then, if desired, passing the resulting dispersion through a conventional filtration device such as a membrane filter. For example, the ink can be prepared by first preparing a mixed liquid by uniformly mixing the total amounts of water and the colorant in advance, dispersing this mixed liquid using a dispersion device, subsequently adding the remaining components to the dispersion, and then passing the resulting dispersion through a filtration device.

<Surface Treatment Liquid for Humidity-Conditioning Base Material>

In order to obtain a decorative portion of higher image quality, the aforementioned ink is preferably used in combination with a specific surface treatment liquid for the humidity-conditioning base material (hereafter also referred to as simply "the surface treatment liquid" or "the treatment liquid"). This surface treatment liquid (or pretreatment liquid) is applied to the surface of the humidity-conditioning base material prior to decoration of the base material by inkjet printing, and comprises at least water, a water-dispersible resin, and inorganic particles having an average particle size of not more than 300 nm. Here, the term "applied" means that the surface treatment liquid is adhered using any appropriate technique such as a coating technique. The pre-decoration humidity-conditioning base material to which the surface treatment liquid is to be applied may be subjected to a different treatment from the treatment by the surface treatment liquid according to the present embodiment, or may be subjected to another arbitrary treatment after application of the surface treatment liquid but before image formation using the ink.

By adhering a special surface treatment liquid to the humidity-conditioning base material in advance, the color development and gloss of the portions decorated with the ink can be enhanced. Particularly in the case of porous base materials having a low amount of moisture adsorption and desorption and/or a low average moisture content, such as humidity-conditioning construction materials having inferior humidity-conditioning properties and having a low grade as prescribed in JIS A 1470-1 (2002) and/or JIS A 1475 (2004), although a high level of color development can be achieved with even a small amount of ink, if the amount of ink applied per unit of time is increased, then there is a possibility that ink overflow may occur, increasing the likelihood of image bleeding and ink accumulation. This ink accumulation not only causes a deterioration in the image quality, but may also block a portion of the pores within the porous base material, causing a deterioration in the humidity-conditioning performance. In such cases, a surface treatment liquid is preferably applied (pretreatment) and then dried on the surface of the porous base material prior to printing.

In the surface treatment liquid, the water functions as the solvent for the surface treatment liquid, and the description of the water provided above in relation to the ink also applies to the surface treatment liquid water. Similarly, the solvent for the surface treatment liquid may also include a water-miscible organic solvent described above in addition to the water.

There are no particular limitations on the inorganic particles, provided they are fine particles having an average particle size (the median size measured by a dynamic light scattering method) of not more than 300 nm If the primary particle size of the inorganic particles exceeds 300 nm, then a state is obtained where the inorganic particles sit on the surface of the porous base material, and therefore the water abrasion resistance of the decorative image deteriorates, or the transparency of the surface-treated portions deteriorates, resulting in a noticeable difference in the external appearance of the surface-treated portions and the non-surface-treated portions, which is also undesirable.

The amount (solid fraction amount) of the inorganic particles in the surface treatment liquid is preferably at least 0.8% by weight, and more preferably 1.3% by weight or greater, but is preferably not more than 20% by weight, and more preferably 10% by weight or less.

The inorganic particles block a portion of the large holes within the porous base material, thus reducing the surface roughness Ra of the base material and preventing components within the ink entering holes in the porous base material, and therefore it is thought that compared with the case where no surface treatment is performed, the smoothness of the surface of the porous base material can be improved, the dot uniformity of the image formed on the surface can be improved, and the gloss of the resins contained within the ink and the surface treatment liquid can manifest favorably. On the other hand, because only a portion of the large holes within the porous base material are blocked, there is no resulting deterioration in the humidity-conditioning properties. The types of effects obtained by this surface treatment cannot be achieved by simply polishing the surface of the porous base material to reduce the surface roughness Ra (the arithmetic average roughness).

In order to further enhance the gloss of the decorative image, the aforementioned inorganic particles are preferably composed of a mixture of first fine particles having an average particle size of at least 40 nm but not more than 300 nm, and second fine particles having an average particle size of less than 40 nm These types of mixtures may have bimodal particle size distributions having peaks in a region where the average particle size is less than 40 nm, and a region where the average particle size is from 40 nm to 300 nm From the viewpoint of the gloss of the decorative portion, the blend ratio of the first fine particles relative to a total value of 100% by weight for the combination of the first fine particles and the second fine particles is preferably within a range from 5 to 95% by weight, more preferably from 15 to 95% by weight, and most preferably from 50 to 95% by weight.

Examples of the inorganic particles include silica fine particles, vermiculite, calcium carbonate and alumina, and among these, silica fine particles are preferred. Further, extenders such as talc, diatomaceous earth, calcium carbonate, barium carbonate, barium sulfate, alumina white, silica, kaolin, mica, acid clay, activated clay and bentonite can also be used favorably. Combinations containing a plurality of these fine particles may also be used.

In the surface treatment liquid, the water-dispersible resin is added to ensure satisfactory fixation of the aforementioned inorganic particles to the porous base material. There are no particular limitations on the water-dispersible resin, provided the resin exhibits good adhesion to the porous base material, and specific examples of resins that may be used include the various water-dispersible resins described above in relation to the ink. A combination of a plurality of water-dispersible resins may also be used.

The amount of the water-dispersible resin within the surface treatment liquid, reported as a ratio between the inorganic particles and the water-dispersible resin (namely, inorganic particles : water-dispersible resin), is preferably within a range from 15:1 to 25:1 (weight ratio). By ensuring that the amount of the water-dispersible resin satisfies this range, the inorganic particles can be fixed satisfactorily to the porous base material.

In the surface treatment liquid, the water-dispersible resin preferably exists in particulate form, and the average particle size of the particles is preferably greater than the diameter of the mesopores in the porous base material that is to be decorated, and more specifically, is preferably greater than 40 nm, more preferably 45 nm or greater, still more preferably 80 nm or greater, and most preferably 150 nm or greater. Although there are no particular limitations on the upper limit for the average particle size, in terms of ensuring a particle size that is suited to inkjet printing, the average particle size is preferably not more than about 300 nm, and is more preferably 250 nm or less.

The amount of the water-dispersible resin contained in the surface treatment liquid is preferably less than the amount of the water-dispersible resin in the ink.

Components other than those described above may also be added to the surface treatment liquid, provided they have no adverse effects on the properties of the surface treatment liquid, and examples of these other components include humectants, antifoaming agents, pH modifiers, antioxidants, preservatives and surfactants.

The surface treatment liquid can be prepared, for example, by dispersing all of the components, including the water, the water-dispersible resin and the inorganic particles, in a conventional dispersion device such as a beads mill, either in a single batch or in a number of separate batches, and then, if desired, passing the resulting dispersion through a conventional filtration device such as a membrane filter.

For example, the surface treatment liquid can be prepared by first preparing a mixed liquid by uniformly mixing the total amounts of water and the inorganic particles in advance, dispersing this mixed liquid using a dispersion device, subsequently adding the remaining components to the dispersion, and then passing the resulting dispersion through a filtration device.

<Method for Producing Decorated Humidity-Conditioning Base Material>

Production of the decorated humidity-conditioning base material (hereafter also referred to as "the decorative article"), namely the article having a printed image on the surface of the humidity-conditioning base material, is performed by printing an image onto the surface of the humidity-conditioning base material by an inkjet printing method using the ink described above.

A surface treatment step of adhering and then drying the aforementioned special surface treatment liquid on the surface of the porous base material is preferably performed prior to performing the inkjet printing.

The adhesion of the surface treatment liquid to the surface of the porous base material may be performed by using a brush, roller, bar coater, air knife coater, or sprayer or the like to uniformly coat the surface of the porous base material, or a printing technique such as inkjet printing, gravure printing or flexographic printing may be used to print an image using the surface treatment liquid. In other words, the surface treatment liquid may be applied across the entire surface of the porous base material, or may be applied only to those locations that are required, for example only to those locations onto which inkjet printing is to be performed using the aforementioned ink.

The coating amount (adhesion amount) of the surface treatment liquid differs depending on the amount of moisture adsorption and desorption and the average moisture content of the porous base material, but in order to achieve a certain level of color development and gloss for the decorative image, the coating amount (solid fraction) is preferably increased for porous base materials having a lower amount of moisture adsorption and desorption and a lower average moisture content. Further, in the case of a porous base material having a surface roughness Ra of about 15 µm, applying a sufficient amount of the surface treatment liquid to achieve an Ra value following the surface treatment of not more than 10 µm, and preferably not more than 8 µm, is desirable in terms of improving the color development and the gloss of the printed image.

As mentioned above, the ideal coating amount for the surface treatment liquid differs depending on the humidity-conditioning performance of the porous base material, and can therefore not be uniformly specified, but the solid fraction amount per unit of coated surface area may be set, for example, to about 15 $g/m^2$ to 30 $g/m^2$ in the case of a grade 1 humidity-conditioning construction material, to about 5 $g/m^2$ to 15 $g/m^2$ in the case of a grade 2 humidity-conditioning construction material, and to about 3 $g/m^2$ to 10 $g/m^2$ in the case of a grade 3 humidity-conditioning construction material.

Inkjet printing to the above porous base material using the aqueous ink can be performed using a typical recording head, and there are no particular limitations on the printing method or the apparatus that is used. By performing drying following the printing (decoration), the water and other volatile components are volatilized from the ink that has been inkjet printed onto the surface of the porous base material, and a decorative article such as a decorative construction material having humidity-conditioning performance is obtained which includes an image composed mainly of the water-dispersible resin and the colorant.

If the surface of the porous base material is smoothed by polishing or the like prior to the surface treatment (or prior to decoration in those cases where a surface treatment is not performed), then the color development and gloss of the printed image can be improved even further. Specifically, it is preferable that the surface roughness Ra is reduced to about 10 µm or less, and more preferably 8 µm or less. The surface roughness Ra can be measured using, for example, a Laser Scanning Microscope VK-8700 manufactured by Keyence Corporation. During measurement, specific portions such as areas of large surface unevenness or recesses within the porous base material may be excluded.

Regardless of whether or not a surface treatment is performed, printing conditions which are useful in obtaining a high-quality decorative image include (i) reducing the size of the ink drops, (ii) reducing the printing speed, (iii) performing unidirectional printing, (iv) performing printing while warming the porous base material, (v) lowering the print resolution, or (vi) using a combination of these printing methods. Particularly in the case of a porous base material that exhibits a low amount of moisture adsorption and desorption and/or a low average moisture content, such as a humidity-conditioning construction material having relatively poor humidity-conditioning properties, and having a low grade as prescribed in the aforementioned humidity-conditioning performance evaluation standards for humidity-conditioning construction materials (for example, a humidity-conditioning construction material of the aforementioned grade 1), bleeding of the image or ink accumulation is likely to occur if a surface treatment is not performed, but by employing the methods described above, image bleeding and ink accumulation can be avoided even if a surface treatment is not conducted.

The printing condition described above in which printing is performed while warming the porous base material is also very effective, regardless of the performance of the porous base material, in those cases where it is necessary to obtain an image of high coloration using a small amount of ink, and in those cases where it is desirable to perform uniform printing of a pattern on a porous base material having significant surface unevenness or across a plurality of porous base materials having different ink adsorption performance. By performing printing while warming the porous base material, the components besides water within the ink, such as the pigment, can be formed in positions close to the surface of the porous base material, and therefore the effect on the humidity-conditioning performance and the shape of the porous base material can be minimized, and a stable image can be obtained.

The porous base material may also be heated following completion of the printing, and this enables the water and other volatile components within the ink to be volatilized completely, while the colorant in the ink can be fixed to the porous base material by the water-dispersible resin.

Any appropriate method may be used for warming the porous base material, and there are no particular limitations on the heating temperature, provided that the nozzles used for the inkjet printing do not dry out, making the ink discharge unstable. For example, heating may be conducted within a range from 50 to 100° C.

In the case of humidity-conditioning construction materials produced by a carbon dioxide hardening reaction, such as the materials disclosed in JP 2002-4447 A, the materials are usually produced via a series of steps comprising: material mixing→press molding→carbon dioxide gas hardening (exothermic)→drying, and the decoration step is then performed on the carbon dioxide gas-hardened body, specifically by a series of steps comprising: carbon dioxide gas-hardened body→decorative printing→heating→natural cooling (completion). In one embodiment, the decoration can be performed on the humidity-conditioning construction material, namely on the carbon dioxide gas-hardened body, but in another embodiment, the decoration can be performed on the molded article obtained following press molding but prior to the carbon dioxide gas hardening. In the latter case, the decorative construction material can be produced via the steps of: material mixing→press molding→decorative printing→carbon dioxide gas hardening (exothermic)→drying (completion), meaning the heat from the carbon dioxide gas hardening step and the drying step can be used to assist the volatilization of the water and other volatile components within the ink. This offers the advantages that the energy consumption can be kept low, the steps can be shortened, and inventory stock of the material prior to decoration becomes unnecessary.

There are no particular limitations on the device used for performing the decoration described above, and for example, a device can be used which comprises at least a mounting section for mounting the humidity-conditioning base material, and an inkjet recording head disposed so as to enable inkjet printing by discharging an ink onto the surface of the humidity-conditioning base material. The device preferably also comprises a surface treatment liquid coating section for applying a surface treatment liquid to the surface of the humidity-conditioning base material, and/or a heating section for heating the humidity-conditioning base material.

More specifically, the device may comprise an input section (such as a scanner) for providing the electronic data (containing a pixel value for each of the pixels) for the decorative image that is to be formed, a recording head section which records an image by discharging an aqueous ink onto the surface of the porous base material, a transport section which, with the porous base material in a mounted state, transports the porous base material to a location opposing the discharge nozzles formed on the lower surface of the recording head section, and a surface treatment liquid coating section which, prior to the porous base material reaching the recording head section, discharges a surface treatment liquid onto the surface of the porous base material, thereby coating the porous base material with the surface treatment liquid. The device is preferably also provided with a heating section (any of various types of heaters, such as a ceramic heater) which heats the decoration region on the porous base material at any arbitrary stage during printing, or before or after printing, thereby accelerating the drying of the discharged surface treatment liquid and/or the ink.

<Use of Aqueous Inkjet Ink for Decorating Humidity-Conditioning Base Material>

Another embodiment of the present invention relates to a use of an aqueous inkjet ink for decorating a humidity-conditioning base material. Details of the ink and the base material are as described above.

More specifically, a use of an aqueous inkjet ink for decorating a humidity-conditioning base material, the ink comprising water, a water-dispersible resin, a colorant, and at least one surfactant selected from among acetylene glycol-based surfactants and silicone-based surfactants. The humidity-conditioning base material preferably exhibits an amount of moisture adsorption, measured after 3 hours in accordance with JIS A 1470-1 (2002), that is greater than 15 g/m$^2$.

<Decorated Humidity-Conditioning Base Material>

The decorated humidity-conditioning base material (decorative article) comprises a decorative portion that has been formed using the ink described above, and has humidity-conditioning performance that exhibits an amount of moisture adsorption, measured after 3 hours in accordance with JIS A 1470-1 (2002), that is greater than 15 g/m$^2$.

The decorative article is, for example, preferably a humidity-conditioning construction material, but besides construction materials, may also be a coaster or a foot mat or the like.

The image formed by inkjet printing is preferably formed on the surface of a porous base material that has been surface treated in advance with the special surface treatment liquid described above, namely coated with the surface treatment liquid.

There are no particular limitations on the recording surface area of the image, and any arbitrary pattern, text, or combination of pattern and text can be freely selected.

EXAMPLES

The present invention is described below in further detail using a series of examples and comparative examples, but the present invention is in no way limited by these examples.

<Production of Aqueous Inks>

The components shown in Table 2 were premixed in the proportions shown in Table 2 and were then dispersed for one minute using a homogenizer, and the thus obtained dispersions were each filtered through a membrane filter with a pore size of 3 μm, thus yielding a series of inks 1 to 12. The ink 10 which contained no surfactant, the ink 11 which contained a surfactant other than an acetylene glycol-based or silicone-based surfactant, and the ink 12 which contained a water-soluble resin rather than a water-dispersible each represents an ink of a Comparative Example.

Details relating to the raw materials shown in Table 2 are as follows. The glycerol was a special grade reagent manufactured by Wako Pure Chemical Industries, Ltd.

BONJET BLACK CW-4: a self-dispersible carbon black dispersion, manufactured by Orient Chemical Industries, Ltd.

SUPERFLEX 420: a self-emulsifying water-based urethane resin, manufactured by DKS Co., Ltd. (average particle size: 47 nm).

ADEKA BONTIGHTER HUX370: a self-emulsifying water-based urethane resin, manufactured by ADEKA Corporation (average particle size: 10 nm).

SUPERFLEX 460S: a self-emulsifying water-based urethane resin, manufactured by DKS Co., Ltd. (average particle size: 56 nm).

SUPERFLEX 150HS: a self-emulsifying water-based urethane resin, manufactured by DKS Co., Ltd. (average particle size: 83 nm).

MOWINYL 966A: an anionic water-based acrylic resin emulsion, manufactured by The Nippon Synthetic Chemical Industry Co., Ltd. (average particle size: 170 nm).

PVA203 10% aqueous solution: a polyvinyl alcohol resin, manufactured by Kuraray Co., Ltd.

SURFYNOL 465: an acetylene glycol-based surfactant, manufactured by Nissin Chemical Co., Ltd.

SILFACE SAG503A: a silicone-based surfactant, manufactured by Nissin Chemical Co., Ltd.

SILFACE SAG002: a silicone-based surfactant, manufactured by Nissin Chemical Co., Ltd.

DISPARLON AQ-7130: an acrylic silicone-based surfactant, manufactured by Kusumoto Chemicals, Ltd.

NEWCOL 566: a polyoxyethylene nonylphenyl ether surfactant, manufactured by Nippon Nyukazai Co., Ltd.

The average particle size of each resin was measured using the dynamic light scattering particle size distribution measuring apparatus "Nanoparticle Analyzer nano Partica SZ-100" (manufactured by Horiba, Ltd.), by diluting each resin dispersion with purified water to achieve a particle concentration of 0.5% by weight, and then determining the median size in a volumetric distribution measured at a temperature of 25° C. under settings including a dispersion medium refractive index of 1.333 and a sample refractive index of 1.600, and with the distribution morphology set to "polydispersity" and "narrow".

In Table 2 below, each of the numerical values in the "solid fraction/non-volatile fraction" column represents either a "non-volatile fraction" in the case of a surfactant, or a "solid fraction" in the case of other components.

<Production of Surface Treatment Liquids>

The components shown in Table 3 were premixed in the proportions shown in Table 3, and were then dispersed for one minute using an ultrasonic dispersion device, thus obtaining surface treatment liquids 1 and 2.

Details relating to the raw materials shown in Table 3 are as follows.

AEROSIL OX-50: a hydrophilic fumed silica, manufactured by Nippon Aerosil Co., Ltd. (primary particle size: 40 nm).

SNOWTEX MP-2040: a colloidal silica, manufactured by Nissan Chemical Industries, Ltd. (primary particle size: 170 to 230 nm, 40% aqueous dispersion).

SNOWTEX 30: a colloidal silica, manufactured by Nissan Chemical Industries, Ltd. (primary particle size: 10 to 15 nm, 30% aqueous dispersion).

SUMIELITE 1010: an ethylene-vinyl chloride copolymer resin emulsion, manufactured by Sumika Chemtex Co., Ltd. (average particle size: 200 nm).

TABLE 2

| | | Solid fraction/ non-volatile fraction | Ink 1 | Ink 2 | Ink 3 | Ink 4 | Ink 5 | Ink 6 |
|---|---|---|---|---|---|---|---|---|
| Pigment dispersion | BONJET BLACK CW-4 | 13% | 46.2 | 46.2 | 46.2 | 46.2 | 46.2 | 46.2 |
| Water-dispersible resin | SUPERFLEX 420 | 35% | | | | | | 12.9 |
| | ADEKA BONTIGHTER HUX370 | 33% | | | | | | |
| | SUPERFLEX 460S | 38% | 11.8 | 11.8 | 11.8 | | | |
| | SUPERFLEX 150HS | 38% | | | | 11.8 | 11.8 | |
| | MOWINYL 966A | 33% | | | | | | |
| Water-soluble resin | PVA203 10% aqueous solution | 10% | | | | | | |
| Surfactant | SURFYNOL 465 | 100% | | | 1.0 | | 3.0 | |
| | SILFACE SAG503A | 100% | 3.0 | 2.0 | 2.0 | | | 3.0 |
| | SILFACE SAG002 | 100% | | | | 3.0 | | |
| | DISPARLON AQ-7130 | 20% | | | | | | |
| | NEWCOL 566 | 100% | | | | | | |
| Water-soluble organic solvent | Glycerol | | 20.0 | 20.0 | 20.0 | 20.0 | 20.0 | 20.0 |
| | Water | | 19.0 | 20.0 | 19.0 | 19.0 | 19.0 | 18.0 |
| | Total | | 100.0 | 100.0 | 100.0 | 100.0 | 100.0 | 100.0 |
| | Amount of surfactant (%) | | 3.0 | 2.0 | 3.0 | 3.0 | 3.0 | 3.0 |
| | Pigment:water-dispersible resin | | 1:0.75 | 1:0.90 | 1:0.75 | 1:0.75 | 1:0.75 | 1:0.75 |
| | | Solid fraction/ non-volatile fraction | Ink 7 | Ink 8 | Ink 9 | Ink 10 | Ink 11 | Ink 12 |
| Pigment dispersion | BONJET BLACK CW-4 | 13% | 46.2 | 46.2 | 46.2 | 46.2 | 46.2 | 34.6 |
| Water-dispersible resin | SUPERFLEX 420 | 35% | | | | | | |
| | ADEKA BONTIGHTER HUX370 | 33% | | 13.5 | | | | |
| | SUPERFLEX 460S | 38% | | | | 11.8 | | |
| | SUPERFLEX 150HS | 38% | | | | | | |
| | MOWINYL 966A | 33% | 13.6 | | 13.6 | | 13.6 | |
| Water-soluble resin | PVA203 10% aqueous solution | 10% | | | | | | 40.0 |
| Surfactant | SURFYNOL 465 | 100% | | | | | | 1.0 |
| | SILFACE SAG503A | 100% | 1.0 | | | | | |
| | SILFACE SAG002 | 100% | | 1.0 | | | | |
| | DISPARLON AQ-7130 | 20% | | | 2.5 | | | |
| | NEWCOL 566 | 100% | | | | | 1.0 | |
| Water-soluble organic solvent | Glycerol | | 20.0 | 20.0 | 20.0 | 20.0 | 20.0 | 10.0 |
| | Water | | 19.2 | 19.3 | 17.7 | 22.0 | 19.2 | 14.4 |
| | Total | | 100.0 | 100.0 | 100.0 | 100.0 | 100.0 | 100.0 |
| | Amount of surfactant (%) | | 1.0 | 1.0 | 0.5 | 0.0 | 1.0 | 1.0 |
| | Pigment:water-dispersible resin | | 1:0.75 | 1:0.75 | 1:0.75 | 1:0.75 | 1:0.75 | 1:0.89 |

TABLE 3

Surface Treatment Liquid Production Examples

| | | Solid fraction | Treatment liquid 1 | Treatment liquid 2 |
|---|---|---|---|---|
| First fine particles | AEROSIL OX-50 | 100% | 7.5 | |
| | SNOWTEX MP-2040 | 40% | | 9.4 |
| Second fine particles | SNOWTEX 30 | 30% | | 12.5 |
| Water-dispersible resin | SUMIELITE 1010 | 50% | 0.8 | 0.8 |
| | Water | | 91.7 | 77.3 |
| | Total | | 100 | 100 |
| | Mass ratio (first fine particles/ second fine particles) | | 100/0 | 50/50 |

Examples, Comparative Examples

Each of the inks 1 to 12 was installed in a commercially available inkjet printer (MMP845H manufactured by MasterMind Inc.), and a monochromatic image including a solid printing region as well as text and fine lines was printed onto a humidity-conditioning construction material "MOISS" (a product name, a material for which the amount of water adsorption and desorption and the equilibrium moisture content prescribed in the humidity-conditioning performance evaluation standards both satisfy grade 3) manufactured by Mitsubishi Materials Kenzai Corporation. Following completion of the printing, the material was heated for 130 seconds on a 70° C. sheet heater, and then subjected to the following evaluations. Further in those cases where a surface treatment was performed (all cases other than Example 1 and Comparative Example 1), the surface treatment liquid 1 or 2 was applied across the entire surface of the MOISS material using a commercially available air sprayer, with a wet coating amount of 78 g/m² (a solid fraction amount of about 6.2 g/m²), and following heating for 130 seconds on a 70° C. sheet heater, the material was then printed using the method described above.

The UV ink of Comparative Example 1 was an ECO-UV ink designed for use in a UV printer VersaUV LEF-12 manufactured by Roland DG Corporation, and following printing to the MOISS material using this printer, the ink was cured by ultraviolet radiation from the UV-LED lamp housed inside the printer.

Each test was conducted in the manner described below, and the evaluation criteria for the tests are shown in Table 4. Further, the evaluation results are shown in Table 5.

The ink storage stability was evaluated by placing the ink in a screw-top vial, sealing the vial, and following storage for 2 weeks in a constant-temperature bath at 70° C., evaluating the change in viscosity before and after storage. The ink viscosity describes the value at a temperature of 23° C., measured using a stress controlled Rheometer AR-G2 (manufactured by TA Instruments, Inc.) with a diameter of 40 mm and a cone angle of 2°.

The discharge stability was evaluated by performing continuous and intermittent discharge, and evaluating the dischargeability.

An objective visual evaluation was conducted by visual inspection.

The 60° gloss value (of the decorative portion) was evaluated by measuring the surface 60° gloss value of the solid image printed onto the humidity-conditioning construction material using a Multi-Gloss 268 (product name) manufactured by Konica Minolta, Inc.

A performance evaluation for the humidity-conditioning construction material was performed by measuring the amount of moisture adsorption and desorption prescribed in JIS A 1470-1 and the equilibrium moisture content prescribed in JIS A 1475 for the humidity-conditioning construction material following solid image printing.

The water abrasion resistance of the image was evaluated by rubbing the printed solid image with a wet sponge.

TABLE 4

Evaluation Criteria

| | | |
|---|---|---|
| Ink storage stability | A | Change in viscosity within ±5% |
| | B | Change in viscosity within ±10% |
| | C | Change in viscosity within ±15% |
| | D | Change in viscosity exceeds ±15% |
| Discharge stability | A | All nozzles discharge with no problems during continuous and intermittent discharge |
| | C | Some discharge faults occur during continuous or intermittent discharge |
| | D | Many discharge faults occur during continuous or intermittent discharge, making formation of a normal image impossible |
| Objective visual evaluation | A | Density and bleeding were both good, an extremely good image representation |
| | B | Density and bleeding were both good, a good image representation |
| | C | Slight problems in terms of the density or bleeding |
| | D | Image representation was not possible |
| Humidity-conditioning construction material performance evaluation | A | The grade was maintained for all items |
| | D | The grade decreased for at least one item |
| Evaluation of water abrasion resistance of image | A | The image was not removed even after 30 or more rubbing repetitions |
| | C | The image was removed after 10 or more but less than 30 rubbing repetitions |
| | D | The image was removed after less than 10 rubbing repetitions |

TABLE 5

Examples and Comparative Examples

| | Example 1 | Example 2 | Example 3 | Example 4 | Example 5 |
|---|---|---|---|---|---|
| Ink | Ink 1 | Ink 1 | Ink 1 | Ink 2 | Ink 3 |
| Surface treatment liquid | none | treatment liquid 1 | treatment liquid 2 | treatment liquid 2 | treatment liquid 2 |
| Storage stability | A | A | A | A | A |
| Discharge stability | A | A | A | A | A |
| Objective visual evaluation | C | B | A | A | A |
| 60° gloss (decorative portion) | 2.4 | 13 | 24 | 24 | 24 |

TABLE 5-continued

Examples and Comparative Examples

|  | | | | | |
|---|---|---|---|---|---|
| Humidity-conditioning construction material performance | A | A | A | A | A |
| Water abrasion resistance of image | A | A | A | A | A |

|  | Example 6 | Example 7 | Example 8 | Example 9 | Example 10 |
|---|---|---|---|---|---|
| Ink | Ink 4 | Ink 5 | Ink 6 | Ink 7 | Ink 8 |
| Surface treatment liquid | treatment liquid 2 | treatment liquid 2 | treatment liquid 2 | treatment liquid 2 | treatment liquid 2 |
| Storage stability | A | C | A | A | A |
| Discharge stability | A | A | A | A | A |
| Objective visual evaluation | B | B | A | A | A |
| 60° gloss (decorative portion) | 24 | 24 | 26 | 22 | 28 |
| Humidity-conditioning construction material performance | A | A | A | A | A |
| Water abrasion resistance of image | A | A | A | A | A |

|  | Example 11 | Comparative Example 1 | Comparative Example 2 | Comparative Example 3 | Comparative Example 4 |
|---|---|---|---|---|---|
| Ink | Ink 9 | UV ink | Ink 10 | Ink 11 | Ink 12 |
| Surface treatment liquid | treatment liquid 2 | none | treatment liquid 2 | treatment liquid 2 | treatment liquid 2 |
| Storage stability | B | — | B | D | C |
| Discharge stability | A | A | D | D | C |
| Objective visual evaluation | B | D | test impossible | test impossible | D |
| 60° gloss (decorative portion) | 22 | 2.8 | test impossible | test impossible | 10 |
| Humidity-conditioning construction material performance | A | D | test impossible | test impossible | A |
| Water abrasion resistance of image | A | D | test impossible | test impossible | D |

In each of the Examples, a high-quality image with excellent water abrasion resistance was able to be be formed on the humidity-conditioning construction material without impairing the humidity-conditioning performance of the humidity-conditioning construction material, namely with retention of the same grade. In particular, performing a pretreatment using a surface treatment liquid improved the visual evaluations of the image, including the gloss value.

On the other hand, in Comparative Example 1 which used a conventional ultraviolet-curable (UV) ink, not only was the image quality inferior, but the humidity-conditioning performance of the humidity-conditioning construction material and the water abrasion resistance of the image also deteriorated.

In Comparative Example 4 which used an aqueous ink containing a water-soluble resin instead of the water-dispersible resin, the objective visual evaluation and the water abrasion resistance of the image deteriorated.

In Comparative Examples 2 and 3, because an ink that either contained no surfactant or contained a different type of surfactant was used, aggregation of the water-dispersible resin particles could not be suppressed, and at least one of the ink storage stability and the discharge stability was poor, meaning subsequent image formation could not be performed.

It is to be noted that, besides those already mentioned above, many modifications and variations of the above embodiments may be made without departing from the novel and advantageous features of the present invention. Accordingly, all such modifications and variations are intended to be included within the scope of the appended claims.

The entire contents of JP 2003-146775 A, JP 2002-4447 A, JIS A 1470-1:2002, and JIS A 1475:2004 are incorporated by reference herein.

The invention claimed is:

1. A method for producing a decorated humidity-conditioning base material comprising:
    performing inkjet printing onto a surface of a humidity-conditioning base material using an aqueous inkjet ink for a humidity-conditioning base material, the ink comprising water, a water-dispersible resin, a colorant, and at least one surfactant selected from among acetylene glycol-based surfactants and silicone-based surfactants,
    the humidity-conditioning base material exhibiting an amount of moisture adsorption measured after three hours in accordance with JIS A 1470-1 (2002) that is greater than 15 g/m$^2$.

2. The method according to claim 1, wherein a median size of the water-dispersible resin measured by a dynamic light scattering method is not more than 300 nm.

3. The method according to claim 1, further comprising prior to performing inkjet printing onto a surface of a humidity-conditioning base material, a surface treatment of adhering a surface treatment liquid containing at least water, a water-dispersible resin, and inorganic particles having a median size measured by a dynamic light scattering method of not more than 300 nm to a surface of the humidity-conditioning base material.

4. The method according to claim 3, wherein the inorganic particles are composed of a mixture of first fine particles having a median size measured by a dynamic light scattering method of at least 40 nm but not more than 300 nm, and second fine particles having a median size measured by a dynamic light scattering method of less than 40 nm.

5. The method according to claim 3, wherein a median size of the water-dispersible resin in the surface treatment liquid, measured by a dynamic light scattering method, is greater than 40 nm.

6. The method according to claim 1, wherein the humidity-conditioning base material comprises a humidity-conditioning construction material.

7. The method according to claim 1, wherein the humidity-conditioning base material comprises a hardened body of an inorganic material.

8. The method according to claim 7, wherein the inorganic material comprises at least one selected from the group consisting of silicate powder, silica gel, diatomaceous earth, activated clay, zeolite, bentonite, montmorillonite, and sepiolite.

9. The method according to claim 1, wherein the humidity-conditioning base material comprises a humidity-conditioning construction material obtained by molding one or more hydrophilic materials selected from among gypsum, calcium silicate, cement, gypsum slag and basic magnesium carbonate; a humidity-conditioning construction material obtained by molding a material prepared by adding expanding and/or releasing minerals to one or more of the hydrophilic materials; or a humidity-conditioning construction material produced by carbon dioxide hardening reaction of a molded body containing calcium carbonate and amorphous silica as main components.

10. A decorated humidity-conditioning base material comprising a decorative portion formed using an aqueous inkjet ink for a humidity-conditioning base material, the ink comprising water, a water-dispersible resin, a colorant, and at least one surfactant selected from among acetylene glycol-based surfactants and silicone-based surfactants, and the base material having an amount of moisture adsorption, measured after 3 hours in accordance with JIS A 1470-1 (2002), of greater than 15 $g/m^2$.

11. The decorated humidity-conditioning base material according to claim 10, wherein the humidity-conditioning base material comprises a humidity-conditioning construction material.

12. The decorated humidity-conditioning base material according to claim 10, wherein the humidity-conditioning base material comprises a hardened body of an inorganic material.

13. The decorated humidity-conditioning base material according to claim 12, wherein the inorganic material comprises at least one selected from the group consisting of silicate powder, silica gel, diatomaceous earth, activated clay, zeolite, bentonite, montmorillonite and sepiolite.

14. The decorated humidity-conditioning base material according to claim 10, wherein the humidity-conditioning base material comprises a humidity-conditioning construction material obtained by molding one or more hydrophilic materials selected from among gypsum, calcium silicate, cement, gypsum slag and basic magnesium carbonate; a humidity-conditioning construction material obtained by molding a material prepared by adding expanding and/or releasing minerals to one or more of the hydrophilic materials; or a humidity-conditioning construction material produced by carbon dioxide hardening reaction of a molded body containing calcium carbonate and amorphous silica as main components.

* * * * *